(12) United States Patent
Thomas et al.

(10) Patent No.: US 8,625,596 B1
(45) Date of Patent: Jan. 7, 2014

(54) MULTI-CHASSIS TOPOLOGY DISCOVERY USING IN-BAND SIGNALING

(75) Inventors: Philip A. Thomas, San Jose, CA (US); Anurag Agrawal, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 457 days.

(21) Appl. No.: 12/982,664

(22) Filed: Dec. 30, 2010

Related U.S. Application Data

(60) Provisional application No. 61/387,239, filed on Sep. 28, 2010.

(51) Int. Cl.
*H04L 12/28* (2006.01)

(52) U.S. Cl.
USPC .......................................... 370/392; 370/351

(58) Field of Classification Search
None
See application file for complete search history.

(56) References Cited

U.S. PATENT DOCUMENTS

| | | | | |
|---|---|---|---|---|
| 8,144,705 B1* | 3/2012 | Aybay | ............................ | 370/389 |
| 2004/0179524 A1* | 9/2004 | Sasagawa et al. | ............. | 370/389 |
| 2007/0206512 A1* | 9/2007 | Hinds et al. | .................... | 370/254 |
| 2009/0268746 A1* | 10/2009 | Ogasahara et al. | ........... | 370/406 |
| 2009/0274066 A1* | 11/2009 | Chen et al. | ..................... | 370/254 |
| 2010/0226377 A1* | 9/2010 | Ogasahara et al. | ........... | 370/400 |

OTHER PUBLICATIONS

Juniper Networks, Inc., Juniper press release announcing the TX Matrix Plus Product, Feb. 2, 2009 and corresponding document describing "Certain Features of Juniper Networks' TX Matrix Plus Product", 5 pages.

* cited by examiner

*Primary Examiner* — Phirin Sam
(74) *Attorney, Agent, or Firm* — Harrity & Harrity, LLP

(57) ABSTRACT

A multi-chassis network device may automatically detect whether cables connected between chassis devices are correctly inserted. The device may insert, into a first data stream output from a first port of the device, control information identifying the first port. The device may receive, from a second data stream received by the first port of the device, second control information identifying a second port, at another device connected to the device via a cable. The device may determine, based on the second control information, whether the connection of the first port to the second port, via the cable, is valid and cause, when the connection of the first port to the second port is determined to not be valid, the device to output an indication that the connection is not valid or to reconfigure the device to make the connection of the first port to the second port valid.

23 Claims, 10 Drawing Sheets

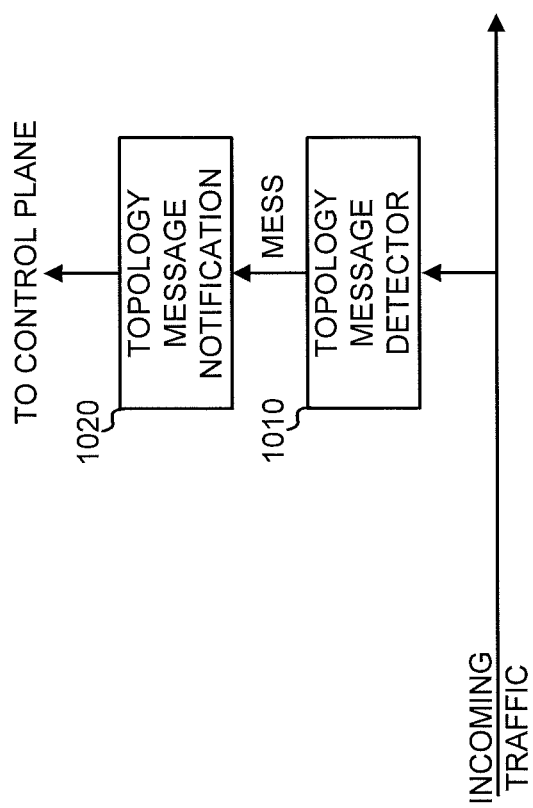

MULTI-CHASSIS TOPOLOGY DISCOVERY USING IN-BAND SIGNALING

RELATED APPLICATION

This application claims priority under 35 U.S.C. §119 based on U.S. Provisional Patent Application No. 61/387,239, filed Sep. 28, 2010, the disclosure of which is incorporated by reference herein in its entirety.

BACKGROUND

Computing and communication networks typically include network devices, such as routers, switches or gateways, which transfer or switch data, such as packets, from one or more sources to one or more destinations. A network switch or router, in particular, may include a networking device that connects network segments and/or computing devices.

The size and capacity of a particular network device may vary considerably depending on the intended application of the network device. For example, routers may provide connectivity inside enterprises, between enterprises and the Internet, and inside Internet Service Providers (ISPs). The largest routers may interconnect ISPs, may be used inside ISPs, may be used inside large data center networks, or may be used in very large enterprise networks. The smallest routers may provide connectivity for small businesses and home offices.

Large routers, such as those marketed to ISPs, may be distributed as a modular "chassis," which the ISP may purchase and connect together to form a single large, high capacity router. When setting up the router, the modular chassis portions may be connected together through cabling, such as optical cabling, that is manually plugged into physical ports of the chassis. The number of cables can be large. Correctly matching one chassis port to a corresponding port on another chassis can be a source of installation errors.

SUMMARY

One implementation may be directed to a network device that includes a port to connect the network device to another network device. The port may include logic to insert topology messages into traffic outgoing from the port, each of the topology messages including an identification of the port and the network device, and logic to extract topology messages from traffic incoming to the port from a second network device. The device may further include a control component to determine, based on an identification of the second network device and a second port at the second network device, as determined from the extracted topology messages, whether the port and the second port form a valid cable connection. The device may further output, to a user, an indication of an invalid cable connection when the determination of whether the port and the second port device form a valid connection indicates an invalid connection.

In another implementation, a device implemented method may include inserting, into a first data stream output from a first port of the device, control information identifying the first port, the control information being inserted in-band with non-control information transmitted from the first port. The method may further include receiving, from a second data stream received by the first port of the device, second control information identifying a second port, at another device connected to the device via a cable. The method may further include determining, based on the second control information, whether the connection of the first port to the second port, via the cable, is valid; and causing, when the connection of the first port to the second port is determined to not be valid, the device to output an indication that the connection is not valid or to reconfigure the device to make the connection of the first port to the second port valid.

In yet another implementation, a device may include a first register to store an identification value for a port that is used to connect, via a cable, modular components of a network device. The device may further include a topology message generator to insert a topology message into traffic outgoing from the port, the topology message including an identification of the port. The device may further include a second register to store a value corresponding to an amount of data that is to be transmitted before the topology message generator inserts the topology message into the traffic; and a traffic counter to measure the amount of traffic that is transmitted, the traffic counter signaling, based on the value of the second register, the topology message generator to insert the topology message into the traffic.

BRIEF DESCRIPTION OF THE DRAWINGS

The accompanying drawings, which are incorporated in and constitute a part of this specification, illustrate one or more implementations described herein and, together with the description, explain the invention. In the drawings.

FIG. 10 is a diagram of an example portion of the port topology component relating to the reception of a topology message.

DETAILED DESCRIPTION

The following detailed description refers to the accompanying drawings. The same reference numbers in different drawings may identify the same or similar elements.

Techniques described herein may relate to the cabling of a multi-chassis network device. Topology messages may be automatically exchanged over each cable connected between two chassis of the network device. The topology messages may be in-band messages that are periodically inserted into the "normal" traffic stream. The network device may use the topology messages to verify that the cables are correctly connected. In response to an incorrect connection, the network device may alert the user, such as through an audible or visible signal, that the cable is incorrectly placed. Alternatively or additionally, in response to the incorrect connection, the network device may automatically reprogram itself to correctly operate with the cable as it was connected.

Figure 1:
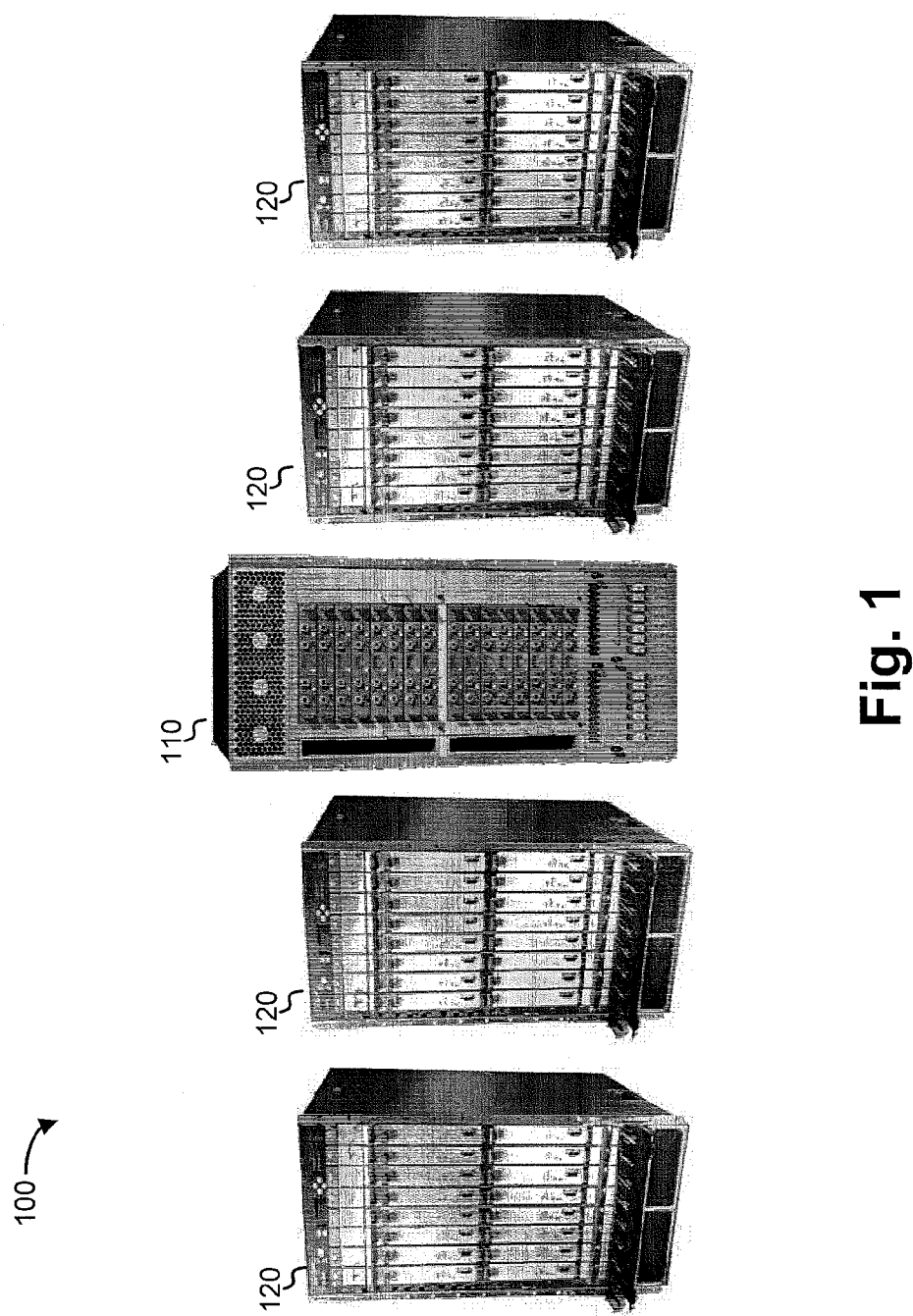
FIG. 1 is a diagram of an example system in which implementations described herein may be implemented.

FIG. 1 is a diagram of an example system 100 in which implementations described herein may be implemented. In one implementation, system 100 may include a multi-chassis router or switch. In other possible implementations, system 100 may implement other types of multi-chassis network devices.

System 100 may include a number of modular components, referred to as "chassis devices" herein. In the example of FIG. 1, system 100 may include a switch fabric chassis (SFC) 110 and one or more line card chassis (LCCs) 120. SFC 110 and LCCs 120 may be connected to one another, such as through optical or coaxial cabling, to form a single virtual network device (e.g., a router). In one particular implementation, SFC 110 may serve as a central switch fabric through which LCCs 120 connect. In other words, each LCC 120 may connect to SFC 110 and data units transmitted between LCCs 120 may go through SFC 110.

Each LCC 120 may include one or more insertable communication "cards" (also called "line cards") that may be inserted into LCC 120. Each card may connect LCC 120 to input/output links that connect system 100 to one or more external networks or devices. Different cards may be inserted into an LCC 120 to provide an interface to different transmission media, such as copper wire or optical fibers. Each LCC 120 may include control plane portions, which may together implement the "intelligence" of system 100, and a data plane portion which may handle the forwarding of data units (e.g., packets) through system 100. The control plane may, for example, examine header information of incoming data units, make routing decisions based on the header information, and forward the data units to an appropriate output port (possibly including an output port on another LCC 120) based on the routing decision.

SFC 110, as previously mentioned, may act as a fabric switch through which LCCs 120 communicate. For example, the switching fabric implemented by SFC 110 may include a three stage switch fabric that includes an input stage, a switching (crossbar map) stage, and an output stage. Each LCC 120 may be connected to SFC 110 using one or more cables in which each cable is inserted into physical connectors at LCC 120 and SFC 110. The number of cables to connect between each LCC 120 and SFC 110 may be relatively large (e.g., numbering in the tens or hundreds).

In the exemplary system 100, one SFC 110 and four LCCs 120 are shown. In other implementations, system 100 may include additional, fewer, different, or differently arranged components. More specifically, system 100 may be designed as a modular network device in which users can add additional SFCs 110 or LCCs 120 as needed. In one implementation, a "full" configuration of system 100 may include up to five SFCs 110 and sixteen LCCs 120.

Figure 2:
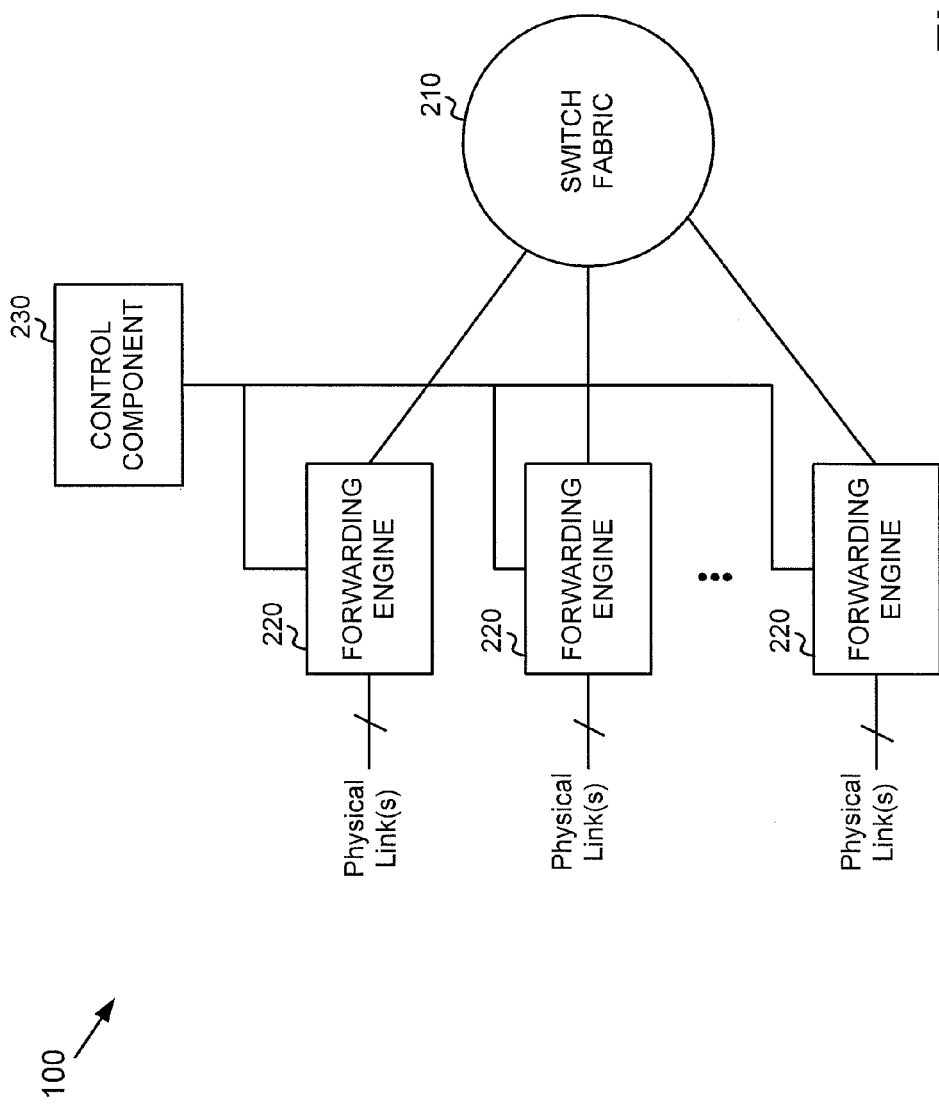
FIG. 2 is a block diagram illustrating an example logical configuration of the system shown in FIG. 1.

FIG. 2 is a block diagram illustrating an example logical configuration of system 100. System 100 may receive data streams from physical links, process the data streams to determine destination information, and transmit the data streams out on links in accordance with the destination information. As shown in FIG. 2, system 100 may include a switch fabric 210, forwarding engines 220, and a control component 230. Each LCC 120 may implement one or more forwarding engines 220. Each forwarding engine 220 may correspond to, for example, a removable card that can be plugged into LCC 120. Switch fabric 210 may be implemented by one or more SFCs 110. Control component 230, although shown as a single component in FIG. 2, may be implemented in a distributed manner at one or more LCCs 120.

Forwarding engines 220 may each be connected to control component 230 and switch fabric 210. Forwarding engines 220 may receive data units at ports on physical links connected to a network, such as a wide area network (WAN) or a local area network (LAN). Each physical link could be one of many types of transport media, such as optical fiber or Ethernet cable. The data on the physical link may be formatted according to one of several protocols, such as the synchronous optical network (SONET) standard, Ethernet, or another format.

Forwarding engines 220 may, for each received data unit, process a header of the data unit to determine an appropriate output port, at either the current forwarding engine 220 or another forwarding engine, for the data unit. Forwarding engines 220 may modify the header of the received data unit before transmitting the data unit to the determined output port. Some received data units may be forwarded to an output port connected to the forwarding engine at which the data unit arrived. Other data units may be forwarded, via switch fabric 210, to other forwarding engines 220 in system 100 for transmission at the determined output port.

Switch fabric 210 may be a switching component designed to allow efficient communication between forwarding engines 220 of LCCs 120. For instance, switch fabric 210 may be a hardwired non-blocking minimal spanning switch capable of connecting N inputs to N outputs in any combination, such as a switch fabric implemented by SFC 110.

Control component 230 may perform high level management functions for system 100. Control component 230 may be part of the "control plane" of system 100. Control component 230 may communicate with other networks and network devices connected to system 100 to exchange information regarding network topology. Control component 230 may create routing tables based on network topology information and forwarding tables based on the routing tables. The forwarding tables may be used by forwarding engines 220 to perform route lookup for incoming data units. Control component 230 may also perform other general control and monitoring functions for system 100. For example, as is described in more detail below, control component 230 may store a data structure indicating valid cable connections between chassis devices. In the context of system 100, as illustrated in FIG. 1, control component 230 may be implemented in a distributed manner in LCCs 120.

Figure 3:
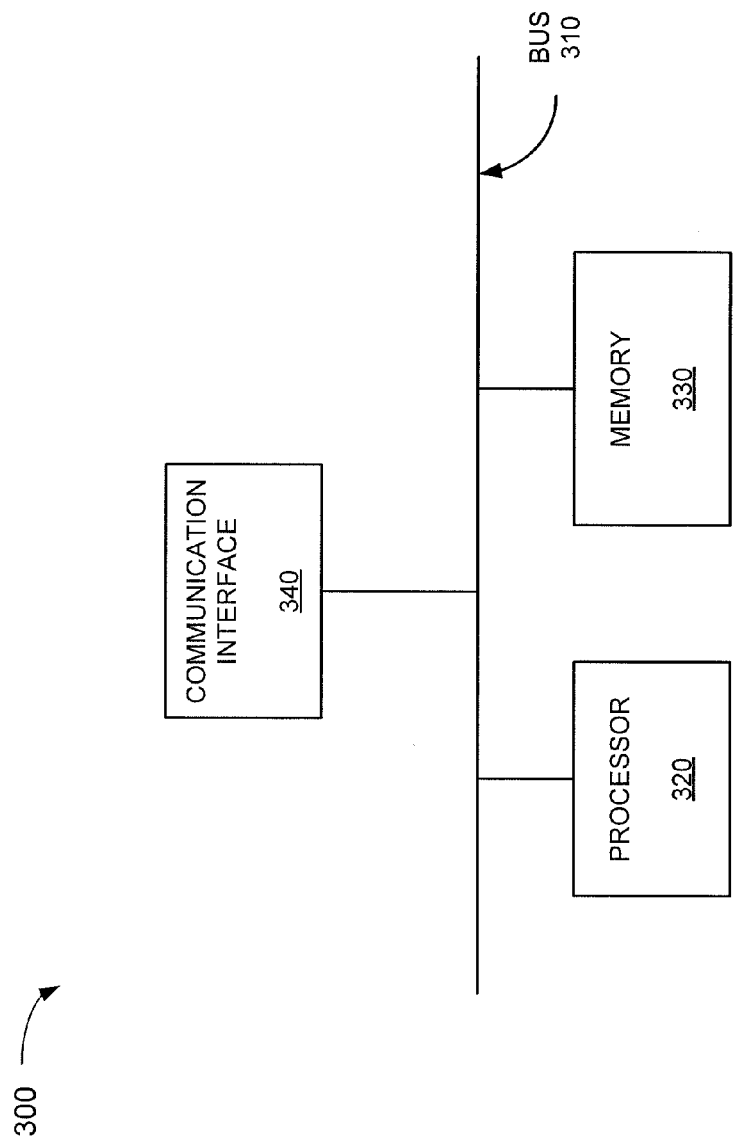
FIG. 3 is a diagram of example components of a device according to an implementation described herein.

FIG. 3 is a diagram of example components of a device 300 according to an implementation described herein. Device 300 may correspond to portions of control component 230 (FIG. 2). As shown, device 300 may include a bus 310, a processor 320, a memory 330, and a communication interface 340.

Bus 310 may permit communication among the components of device 300. Processor 320 may include one or more processors and/or microprocessors that interpret and execute instructions. Additionally or alternatively, processor 320 may be implemented as or include one or more application-specific integrated circuit (ASICs), field-programmable gate array (FPGAs), or the like. Memory 330 may include a RAM or another type of dynamic storage device that stores information and instructions for execution by processor 320, a ROM or another type of static storage device that stores static information and instructions for the processor 320, and/or some other type of magnetic or optical recording medium and its corresponding drive for storing information and/or instructions.

Communication interface 340 may include any transceiver-like mechanism that allows device 300 to communicate with other devices and/or systems. For example, communication interface 340 may include mechanisms for communicating with forwarding engines 220 in the control plane of system 100.

As will be described in detail below, device 300 may perform certain functions in response to processor 320 executing software instructions contained in a non-transitory computer-readable medium, such as memory 330. The software instructions may be read into memory 330 from another computer-readable medium or from another device via communication interface 340. The software instructions contained in memory 330 may cause processor 320 to perform processes that will be described later. Alternatively, hardwired circuitry may be used in place of or in combination with software instructions to implement processes consistent with embodiments described herein. Thus, systems and methods described herein are not limited to any specific combination of hardware circuitry and software.

Although FIG. 3 illustrates example components of device 300, in some implementations, device 300 may include fewer components, different components, differently arranged components, or additional components than those depicted in FIG. 3. Additionally, or alternatively, one or more components of device 300 may perform one or more tasks described as being performed by one or more other components of device 300.

Figure 4:
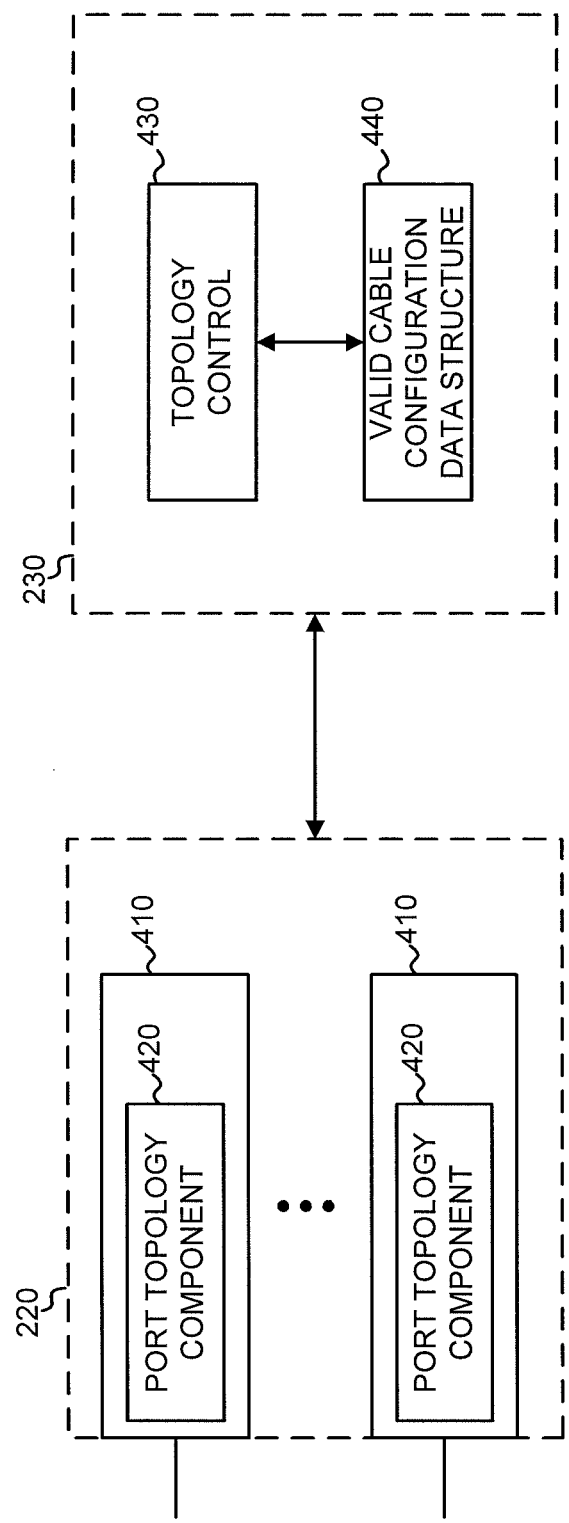
FIG. 4 is a diagram illustrating an example implementation of a portion of the system shown in FIG. 1.

FIG. 4 is a diagram illustrating an example implementation of a portion of system 100. The portions of system 100, as shown in FIG. 4, may be portions that relate to the in-band transmission of messages, such as topology messages, among chassis devices in system 100. As shown in FIG. 4, forwarding engines 220 may include ports 410 that each include a port topology component 420. Further, control component 230 may include a topology control component 430 and a valid cable configuration data structure 440. Topology control component 430 and valid cable configuration data structure 440 may be in the control plane of system 100.

As used herein, the "topology" of system 100 may refer to the arrangement of cables, such as optical cables, that connect the various chassis devices, such as SFCs 110 to LCCs 120. In FIG. 2, the connections formed by these cables may be represented by the lines from forwarding engines 220 to switch fabric 210.

Each port 410 may include hardware and/or software used to provide the physical transmission of data over a link, such as an optical cable. Each port 410 may also include the physical structure used to hold the physical link, such as the optical cable, into the structure in which the port is installed (e.g., LCC 120 or SFC 110). Ports 410 may particularly refer to the ports used to connect various chassis of system 100. Each port 410 may correspond to the physical interface into which a cable is inserted.

Each port 410 may include a port topology component 420. Port topology component 420 may generally operate to periodically insert topology messages into the egress data stream. The topology messages may include, for example, an identifier corresponding to the port and an identifier corresponding to the chassis device. For example, each SFC 110 and LCC 120 may be assigned a globally unique chassis device identifier. This globally unique device identifier, along with a port number, may be included in each topology message.

Port topology component 420 may also operate to locate and extract topology messages included in ingress data streams. Each topology message may include one or more predefined bit patterns that identify the message as a topology message. Additionally, topology messages may be periodically transmitted, such as every X number of bits. Based on the predefined bit patterns and/or the known periodicity of the topology messages, port topology component 420 may locate and extract ingress topology messages. The identifier corresponding to the port and the identifier corresponding to the device, which may be extracted from the topology message, may be transmitted to topology control component 430.

Topology control component 430 may include logic to receive and process information from topology control messages received by a chassis device, such as SFC 110 and/or LCC 120. Topology control component 430 may, for example, compare, for each port 410 at which a topology message is received, the port/device identifiers associated with the topology message with the valid ports for that port/device identifier combination. Information describing valid port/device identifiers may be stored in valid cable configuration data structure 440.

Valid cable configuration data structure 440 may include, for example, a file, a data base, or other data structures that include information relating to valid port/device configurations. For example, in one implementation, valid cable configuration data structure 440 may include an indication of which port numbers of a particular chassis device are compatible with other port numbers of another chassis device. In some implementations, system 100 may be set up in multiple different modes or configurations, each of which may be associated with a different set of valid port connection configurations. In this situation, valid cable configuration data structure 440 may include, for each mode or configuration setting, an indication of which port numbers of a particular chassis device are compatible with other port numbers of another chassis device. In another possible implementation, each port of one chassis device may connect to a set of valid ports at another chassis device. In this situation, valid cable configuration data structure 440 may include an indication of the set of valid ports that may correspond to each port in the current chassis device.

The operation of port topology component 420, topology control component 430, and valid cable configuration data structure 440 will be described in more detail below. Although FIG. 4 shows an example implementation of a portion of system 100, in other implementations, the portion of system 100 shown in FIG. 4 may include fewer components, different components, differently arranged components, or additional components than depicted in FIG. 4. Alternatively, or additionally, one or more of the illustrated components may perform one or more other tasks described as being performed by one or more other components.

Figure 5:
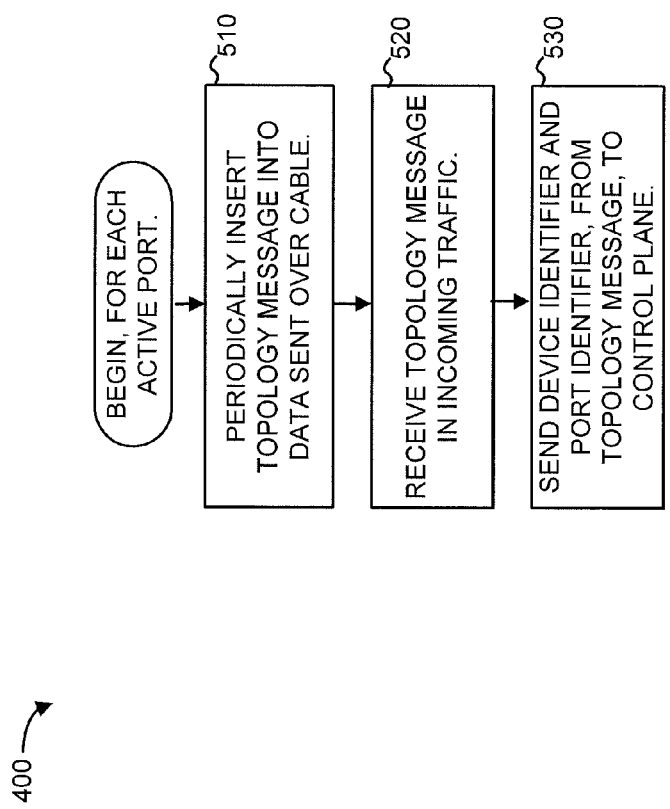
FIG. 5 is a flow chart illustrating an example process for discovering the topology in a multi-chassis device.

FIG. 5 is a flow chart illustrating an example process 500 for discovering the topology in a multi-chassis device. Process 500 may be performed, for example, by each chassis device, such as by port topology component 420 of SFC 110 and/or LCC 120, of system 100.

Process 500 may include periodically inserting a topology message into the data sent over a cable (block 510). For example, port topology component 420 may insert a topology message into, for example, a data stream for a single optical fiber in each cable that connects to another chassis device in system 100. As previously mentioned, the topology message may be inserted periodically, such as every certain number of transmitted bits or after the elapse of a time interval, and may include a predetermined header and/or trailing bit pattern to distinguish the topology message from other data.

Figure 6:
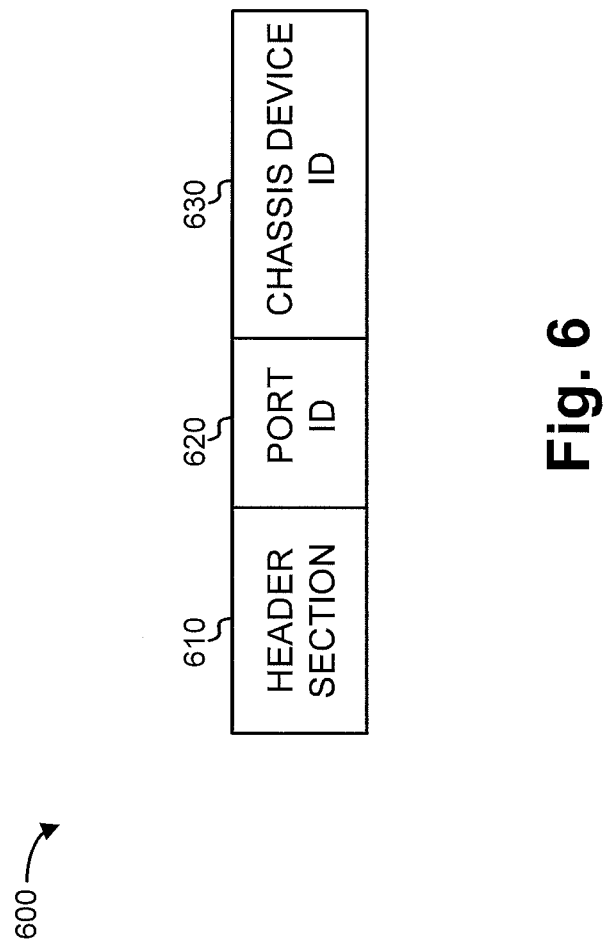
FIG. 6 is a diagram illustrating fields in an example topology message.

FIG. 6 is a diagram illustrating fields in an exemplary topology message 600. As shown, topology message 600 may include a header section 610, a port identifier (ID) section 620, and a chassis device identifier (ID) section 630. Header section 610 may include the predetermined bit pattern that is used to distinguish topology message 600 as a topology message (as opposed to other data). Port ID section 620 may include an identifier, such as a port number or other code, which indicates the port that generated and transmitted topology message 600. Chassis device ID section 630 may include an identifier that identifies the chassis device that includes the port that generated and transmitted topology message 600. The identifier in chassis device ID section 630 may be, for instance, a globally unique value or a value that identifies the type of device (e.g., SFC or LCC) and the model of the device.

FIG. 6 illustrates a number of example fields in topology message 600. In other implementations, topology message 600 may include additional, different, or fewer fields.

Referring back to FIG. 5, process 500 may further include receiving topology messages in incoming traffic (block 520). The incoming topology messages may be topology messages transmitted from other chassis devices, such as other devices in system 100. The topology messages may be received in-band with other data and may be recognized by port topology component 420 as topology messages based on, for example, the transmitted periodicity of the topology messages and/or predetermined bit patterns used to identify a message as a topology message. In one implementation, port topology component 420 may be initialized to lock onto the periodicity of the topology messages by searching the received data stream for the predetermined bit pattern and using the periodicity of the topology messages to "lock on" to additional instances of the topology message.

Process 500 may further include transmitting the port identifier (e.g., from port ID section 620 of the topology message) and the chassis device identifier (e.g., from device ID section 630 of the topology message) to topology control component 430. Additionally, in some implementations, a port identifier for the receiving port may also be transmitted to topology control component 430. In one implementation, this information (i.e., the port identifier of the sending chassis device, the chassis device identifier, and the port identifier of the receiving device) may only be transmitted when the port identifier or chassis device identifier in the received topology message is different from the previous topology messages. Thus, in this situation, only changes in the connection status of the cable may be transmitted to topology control component 430.

Figure 7:
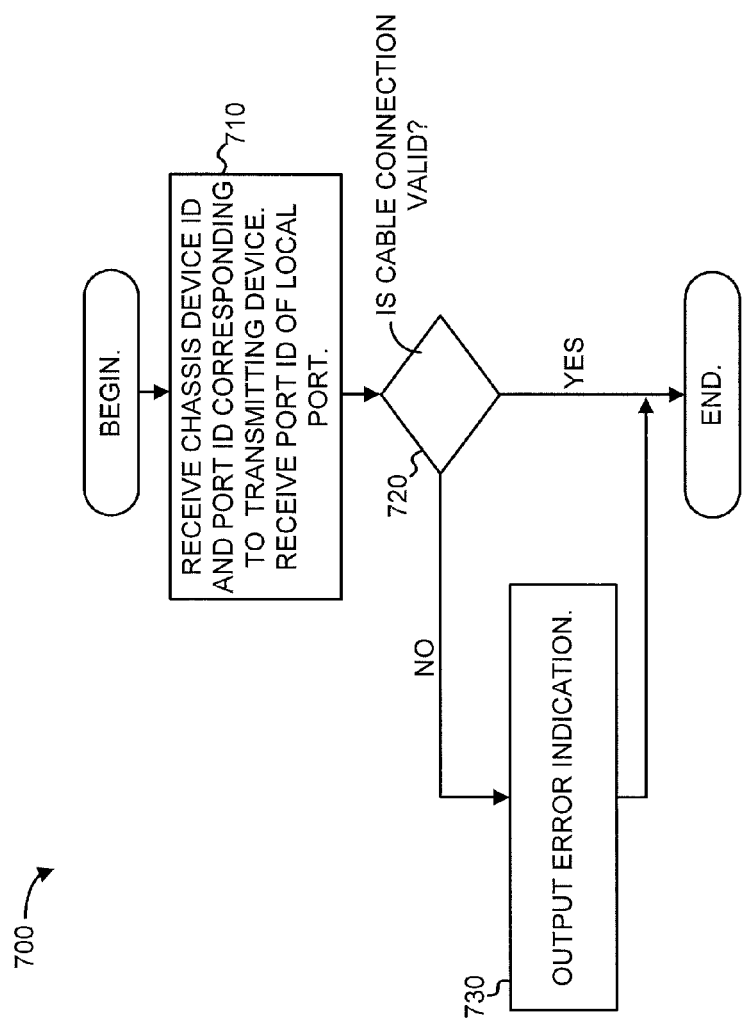
FIG. 7 is a flow chart illustrating an example process for processing port/chassis device identifier information.

FIG. 7 is a flow chart illustrating an example process 700 for processing port/chassis device identifier information. Process 700 may be performed, for example, by topology control component 430.

Process 700 may include receiving the chassis device identifier and port identifier corresponding to the chassis device that transmitted a topology message (block 710). This information may be received by topology control component 430 in response to port topology component 420 receiving a topology message (e.g., blocks 520 and 530 in FIG. 5). The port identifier of the local, receiving port may also be received (block 710). At this point, topology control component 430 may be aware of where both ends of the cable, corresponding to the topology message, are connected.

Process 700 may further include determining whether the cable connection is valid (block 720). Topology control component 430 may lookup, in valid cable configuration data structure 440, whether the cable connection is a valid or permissible connection. For example, topology control component 430 may lookup whether the cable connection is valid given the particular configuration of system 100. In some configurations, each cable between two chassis devices, such as between SFC 110 and LCC 120, may be required to be connected to specific ports on each of the devices. In other configurations, a cable that is inserted into one port on one of the chassis devices can be inserted into a range of possible valid ports in the other device.

When the cable connection is determined to not be valid (block 720—NO), an error indication may be output (block 730). The chassis device detecting the non-valid cable connection may, for example, alert the user through an audible and/or visual indication of the non-valid cable connection. For example, each port may be associated with an "error" light which may be turned on when a non-valid cable connection is detected. Alternatively or additional, a sound may be emitted when a non-valid cable connection is detected. Advantageously, the error indication may be made soon after the cable is inserted so that the installer will immediately know that the cable is incorrectly inserted and can remove the cable and place it into its correct port.

Figure 8:
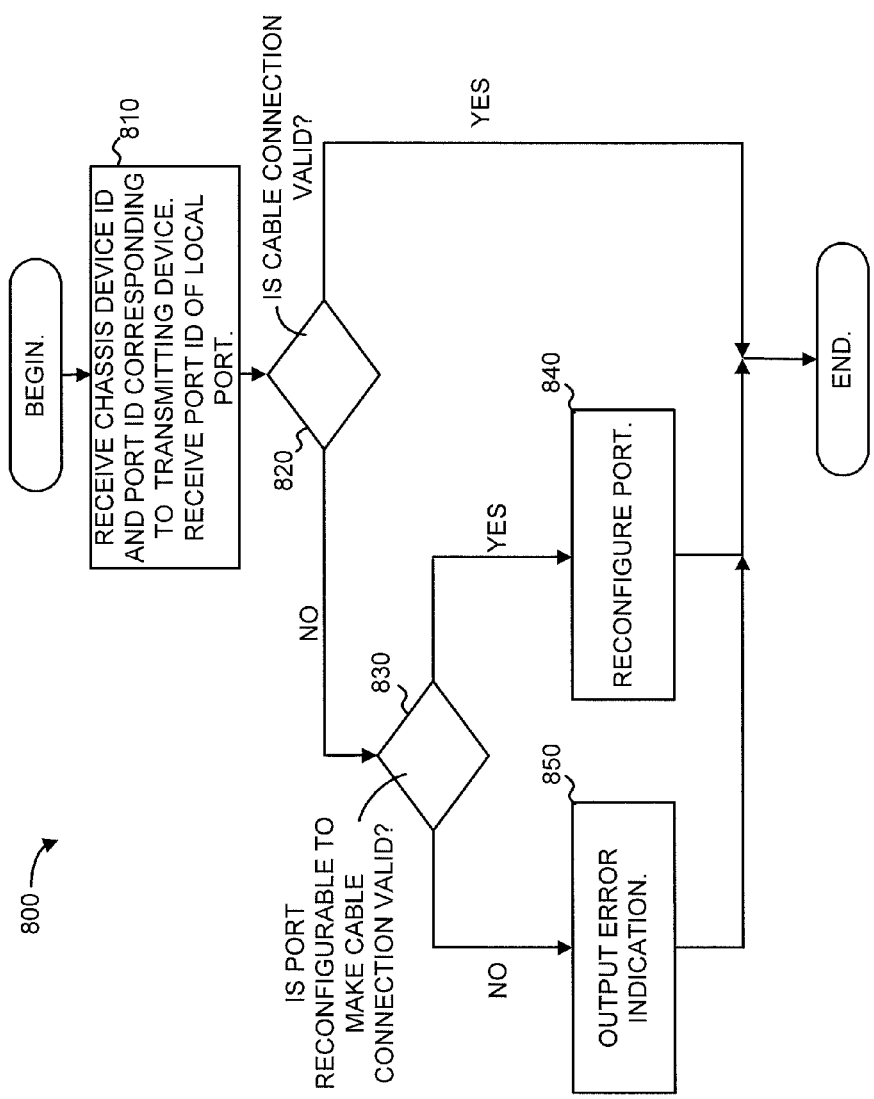
FIG. 8 is a flow chart illustrating an example process for processing port/chassis device identifier information according to a second possible implementation.

FIG. 8 is a flow chart illustrating an example process 800 for processing port/chassis device identifier information according to a second possible implementation. Process 800 may be performed, for example, by topology control component 430 of each chassis device. Process 800 may be performed for system 100 in situations in which chassis devices can dynamically change the function of ports. For example, in the context of a router, forwarding or routing tables may be modified to swap the functionality of two ports.

Process 800 may include receiving the chassis device identifier and port identifier corresponding to the chassis device that transmitted a topology message (block 810). This information may be received by topology control component 430 in response to port topology component 420 receiving a topology message (e.g., blocks 520 and 530 in FIG. 5). The port identifier of the local, receiving port may also be received (block 810). At this point, topology control component 430 may be aware of where both ends of the cable, corresponding to the topology message, are connected.

Process 800 may further include determining whether the cable connection is valid (block 820). Topology control component 430 may lookup, in valid cable configuration data structure 440, whether the cable connection is a valid or permissible connection. For example, topology control component 430 may lookup whether the cable connection is valid given the particular configuration of system 100. In some configurations, each cable between two chassis devices, such as between SFC 110 and LCC 120, may be required to be connected to specific ports on each of the devices. In other configurations, a cable that is inserted into one port on one of the chassis devices can be inserted into a range of possible valid ports in the other device.

When the cable connection is determined to not be valid (block 820—NO), process 800 may include determining whether the local port is reconfigurable to make the cable connection valid (block 830). In some implementations, one or more of the ports on the chassis device may be re-configurable so that the logical function of a port can be mapped to one or more other physical ports. For example, when initially plugged in, the port may be designated as a port that is to connect to a first chassis device, but the plugged in cable may connect to a second chassis device. If topology control component 430 is able to swap the logical functions of these two ports, the port may be determined to be reconfigurable.

When a port is determined to be reconfigurable (block 830—YES), the port may be reconfigured to be valid in the context of the cable currently plugged into the port (block 840). For a router, for example, routing or forwarding tables may be modified to reflect the chassis device connected at the other end of the cable.

When the port is determined to not be reconfigurable, (block 830—NO), an error indication may be output (block 850). The chassis device detecting the non-valid cable connection may, for example, alert the user through an audible and/or visual indication of the non-valid cable connection. For example, each port may be associated with an "error" light which may be turned on when a non-valid cable connection is detected. Alternatively or additional, a sound may be emitted when a non-valid cable connection is detected.

Figure 9:
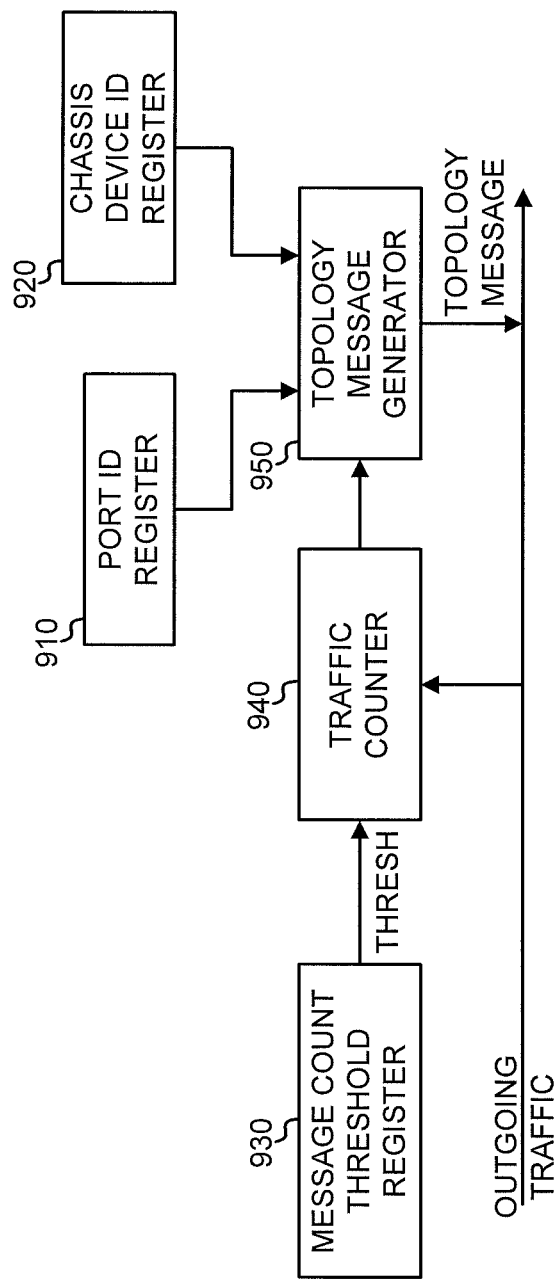
FIG. 9 is a diagram of an example portion of the port topology component relating to the transmission of a topology message.

FIG. 9 is a diagram of an example portion of port topology component 410 relating to the transmission of a topology message. As shown in FIG. 9, port topology component 410 may include a number of programmable registers, including a port ID register 910, a chassis device ID register 920, and a message count threshold register 930. Additionally, port topology component 410 may include a traffic counter 940 and a topology message generator 950.

Port ID register 910 may be a register programmed to store the port identifier, such as a port number value, for the port in which port topology component 410 is implemented. Similarly, chassis device ID register 920 may be a register programmed to store the chassis device identifier for the chassis device.

Message count threshold register 930 may be a register that stores a value relating to the frequency with which a topology message is generated. For example, a value of 100,000 may indicate that a topology message is to be generated and inserted into the outgoing traffic every 100,000 bits. Message count threshold register 930 may be a programmable register that can be set by the manufacturer and/or the administrator of system 100. Message count threshold register 930 may generally be used to control the relative bandwidth with which topology messages are transmitted in-band with the other outgoing traffic. For example, a higher value for message count threshold register 930 may result in less frequent transmission of the topology messages.

Traffic counter 940 may measure the amount of outgoing traffic, such as by counting the number of outgoing bits. Traffic counter 940 may receive the threshold value (THRESH) from message count threshold register 930 and output a signal to topology message generator 950 every time the threshold number of bits have been transmitted. In other implementations, traffic counter 940 may generate the signal to topology message generator 950 in other ways, such as based on an elapsed period time value, as set in register 930.

Topology message generate 950 may generate, when signaled by traffic counter 940, a topology message (e.g., topology message 600). The topology message may include the port identifier from port ID register 910 and the chassis device identifier from chassis device ID register 920. The topology message may be sent as part of the outgoing traffic.

Although FIG. 9 shows an example implementation of a portion of port topology component 410, in other implementations, the portion of port topology component 410 shown in FIG. 9 may include fewer components, different components, differently arranged components, or additional components than depicted in FIG. 9. Alternatively, or additionally, one or more of the illustrated components may perform one or more other tasks described as being performed by one or more other components.

FIG. 10 is a diagram of an example portion of port topology component 410 relating to the reception of a topology message. As shown in FIG. 10, port topology component 410 may include a topology message detector component 1010 and a topology message notification component 1020.

Topology message detector component 1010 may include logic to detect and extract topology messages that are embedded within incoming traffic. Topology message detector component 1010 may, for example, based on the expected periodicity of the topology messages and/or known bit patterns in a header portion of the topology messages, detect the topology messages in the incoming traffic stream. Topology message detector component 1010 may then extract the topology messages and forward the topology messages to topology message notification component 1020.

Topology message notification component 1020 may notify control component 430 of the reception of the topology message. Topology message notification component 1020 may, for example, transmit the port identifier from the topology message, the chassis device identifier from the topology message, and an identifier for the port at which the topology message was received, to control component 430. In one implementation, topology message control component 1020 may only notify control component 430 when the currently received topology message does not match the previously received topology message.

Although FIG. 10 shows an example implementation of a portion of port topology component 410, in other implementations, the portion of port topology component 410 shown in FIG. 10 may include fewer components, different components, differently arranged components, or additional components than depicted in FIG. 10. Alternatively, or additionally, one or more of the illustrated components may perform one or more other tasks described as being performed by one or more other components.

As described above, a small amount of topology information for a multi-chassis network device is transmitted in-band. The topology information may be transmitted as part of a training and alignment process that needs to be performed to align transmissions between devices in the multi-chassis network device. Advantageously, errors in connecting the cabling between chassis devices can be quickly detected and reported or the errors can be corrected by reconfiguring the role of the ports of the device.

Although the in-band topology message transmissions were described herein as being used to discover errors in cabling between chassis devices, in alternative possible implementations, other types of information may be included in the "topology" message and used by the chassis devices.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

While series of blocks have been described in FIGS. 5, 7, and 8, the order of the blocks may vary in other implementations. Also, non-dependent blocks may be performed in parallel.

Even though particular combinations of features are recited in the claims and/or disclosed in the specification, these combinations are not intended to limit the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

Further, certain aspects described herein may be implemented as "logic" or as a "component" that performs one or more functions. This logic or component may include hardware, such as an ASIC or a FPGA, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A network device comprising:
 a port to connect the network device to a second network device, the port including logic to:
  insert topology messages into traffic outgoing from the port, each of the topology messages including an identification of the port and the network device,
   the topology messages being inserted into the traffic outgoing from the port as part of a training and alignment process for the traffic, and
  extract topology messages from traffic incoming to the port from the second network device; and
 a control component to:
  determine, based on an identification of the second network device and a second port at the second network device, as determined from the extracted topology messages, whether the port and the second port form a valid cable connection, and
  output, to a user, an indication of an invalid cable connection when the determination of whether the port and the second port device form a valid connection indicates an invalid connection.

2. The network device of claim 1, where the indication of the invalid connection includes a visual or audible indication.

3. The network device of claim 1, where the control component is further to:
 determine, when the port and the second port of the second network device are determined to form an invalid connection, whether the port is eligible to be reconfigured to form a valid connection with the second port; and
 reconfigure the port to form the valid connection when the port is eligible to be reconfigured to form the valid connection.

4. The network device of claim 1, where the network device and the second network device include devices in a multi-chassis router or switch.

5. The network device of claim 1, where the topology messages are inserted into the outgoing traffic on a per-cable basis.

6. The network device of claim 1, where the port further includes logic to:
 forward one of the extracted topology messages to the control component when the one of the extracted topology messages includes information different than a previous one of the extracted topology messages.

7. The network device of claim 1, where the port further includes:
 a programmable register to store a value that controls a period with which the topology messages are inserted into the traffic outgoing from the port.

8. The network device of claim 1, where the port further includes:
 a programmable register to store a value that defines a number of bits that are transmitted between successive topology messages.

9. The network device of claim 1, where the port corresponds to a physical interface into which a cable is inserted.

10. A method comprising:
 inserting, by a device and into a first data stream output from a first port of the device, first control information identifying the first port,
  the first control information being inserted in-band with non-control information transmitted from the first port, and
  the first control information being inserted into the first data stream as part of a training and alignment process;
 receiving, by the device and from a second data stream received by the first port of the device, second control information identifying a second port at another device connected to the device via a cable;
 determining, by the device and based on the second control information, whether the connection of the first port to the second port, via the cable, is valid; and
 causing, when the connection of the first port to the second port is determined to not be valid, the device to output an indication that the connection is not valid or to reconfigure the device to make the connection of the first port to the second port valid.

11. The method of claim 10, where the first port corresponds to a physical interface into which the cable is inserted.

12. The method of claim 10, where the first control information additionally identifies the device.

13. The method of claim 10, where the device is a modular component of a multi-chassis router or switch.

14. The method of claim 10, where determining whether the connection of the first port to the second port is valid includes:
 determining that the second control information is different than a previous version of the second control information, and
 determining whether the connection of the first port to the second port is valid after determining that the second control information is different than the previous version of the second control information.

15. The method of claim 10, where the first control information includes information regarding a topology of a network associated with the device.

16. A device comprising:
 a first register to store an identification value for a port that is used to connect, via a cable, modular components;
 a topology message generator to insert a topology message into traffic outgoing from the port,
  the topology message including an identification of the port;
 a second register to store a value corresponding to an amount of data that is to be transmitted before the topology message generator inserts the topology message into the traffic; and
 a traffic counter to measure the amount of traffic that is transmitted,
  the traffic counter signaling, based on the value of the second register, the topology message generator to insert the topology message into the traffic.

17. The device of claim 16, further comprising:
 a third register to store an identification value corresponding to the device.

18. The device of claim 16, where the value stored in the second register represents a number of bits that are to be transmitted before the topology message generator inserts the topology message into the traffic.

19. The device of claim 16, further comprising:
a topology message detector to extract a second topology message from incoming traffic at the port,
the second topology message including an indication of a second port corresponding to a second device from which the second topology message was sent.

20. The device of claim 16, further comprising:
a control component to determine whether the port and a second port, associated with a second device, correspond to a valid connection between the device and the second device.

21. The device of claim 20, where the control component is to output a visual or audio signal when the port and the second port are determined to not correspond to a valid connection.

22. The device of claim 20, where the control component is to reconfigure the device, to form a valid connection between the port and the second port, when the port and the second port are determined to not correspond to a valid connection.

23. The device of claim 16, where the port corresponds to a physical interface into which a cable is inserted.

* * * * *